United States Patent Office 3,345,316
Patented Oct. 3, 1967

3,345,316
ASPHALT-RESIN-BLOCK COPOLYMER ROOFING
COMPOSITIONS
Carl L. Nielsen, Walnut Creek, Calif., assignor to Shell
Oil Company, New York, N.Y., a corporation of
Delaware
No Drawing. Filed Mar. 22, 1965, Ser. No. 441,891
7 Claims. (Cl. 260—28.5)

This invention is directed to improved roofing compositions. More particularly, it is concerned with compositions comprising asphalt, chlorinated polyphenyl resins, and certain specified block copolymers.

Asphalt is a common material utilized for the preparation of roofing members and coatings which may be applied as mopping grade asphalts, cutbacks in solvents, single membranes, shingles, etc. While the material is suitable in many respects, it inherently is deficient in some physical properties which it would be highly desirable to improve. Efforts have been made in this direction by the addition of certain conjugated diene rubbers, neoprene, resins, fillers, and other materials for the modification of one or more of the physical properties of the asphalt binder. Each of these added materials modifies the asphalt in one respect or another but up to the present time certain deficiencies can be noted in all compounds proposed. For example, some of them may have excellent weather resistance, sealing and bonding properties but are often deficient with respect to warm tack, modulus, hardness, and other physical properties.

It is an object of the present invention to provide improved asphaltic roofing compositions. It is a special object of the invention to provide improved fire-resistant asphalt compositions having additionally improved physical properties. Special objections of the invention comprise the provision of such compositions possessing unexpected improvements in hardness, modulus, tensile strength, and flexibility, as well as elongation. Other objects will become apparent during the following detailed description of the invention.

Now, in accordance with the present invention, improved asphalt compositions especially suitable for roofing purposes as well as for special binders are provided comprising the following essential components:

(a) 45–75% by weight of an asphalt of the group consisting of straight run asphalt having a viscosity between about 350–450 SSF at 210° F., blown asphalt having a softening point between about 110° F. and 185° F., and mixtures thereof;
(b) 15–35% by weight of chlorinated polyphenyl resins containing from about 30% to about 65% by weight of chlorine;
(c) and 10–30% by weight of a block copolymer of the group consisting of copolymers having the general configuration

A—B—A wherein each A is a polymer block of a vinyl arene and B is a polymer block of a conjugated diene; the average molecular weight of A being between about 8,000 and 45,000, the average molecular weight of B being between about 40,000 and 125,000, the total A content of the block copolymer being between about 23 and 40 weight percent; and hydrogenated derivative of such block copolymers.

The unexpected findings include the surprising improvement in physical properties, particularly with respect to elongation at break, tensile at break, modulus, and hardness as well as with respect to the excellent weatherability and toughness associated with high grade roofing materials. Also, one of the outstanding aspects of the present compositions comprises their fire-resistant properties. In this respect, in utilizing the compositions of the invention for purposes other than roofing, the fire retardant properties of the chlorinated polyphenyl resins may be capitalized upon by adjusting their proportion to the remaining components to such a degree that the compositions may be employed as binders for solid repellents having a controlled and predictable burning rate.

The block copolymers described above are a unique class of elastomeric materials exhibiting the properties of a vulcanized rubber without the necessity for a vulcanizing treatment or vulcanizing agent. This in turn constitutes a technical and economic advantage as compared with similar compositions containing ordinary conjugated diene elastomers which require such a vulcanizing treatment if maximum physical properties of the compositions are to be obtained. Moreover, it has been observed that the block copolymers described above are exceptionally compatible with the asphalts of the particular class to which the present invention is restricted.

The asphalts forming the major component of the compositions of this invention are relatively narrowly restricted since certain limitations have been found to exist relative to the use of the compositions as roofing components. For example if certain asphalts other than those described are employed, the sag resistance of the resulting compositions was not as great as that of blends made with the residues described above. Moreover, if blown asphalts having softening points higher than those described above, the elongation of the resulting blends dropped off markedly.

Furthermore, the presence of the described class of chlorinated polyphenyl resins is essential for reducing the tackiness of the composition comprising asphalt and block copolymer as well as increasing the hardness and stiffness of the compositions to the point where they are suitable for roofing purposes and do not become too soft and limp to apply and walk on, especially in hot weather.

The asphalts to which the present invention is restricted are of two principal classes, namely, asphalts of a relatively soft nature having a viscosity between about 350 and 450 SSF at 210° F., preferably between about 370 and 430 SSF at 210° F. In the roofing trade, these asphalts are normally referred to as "premium coating" grade straight run asphalt fluxes.

In addition to the soft straight run asphalts described above, it is also possible for the present purpose to utilize a restricted range of blown asphalts, namely, those having softening points between about 110° F. and 185° F. It has been found that if more highly blown materials, e.g., those having higher softening points are employed in the compositions comprising asphalt, chlorinated polyphenyl resins, and block copolymers, the elongation of the blends dropped off markedly. The use of the blown asphalts substantially increases the hardness and tensile strength of the resulting compositions of asphalt, block copolymer, and chlorinated resin. If blown asphalts are employed in the subject compositions, it is preferred that they have softening points between about 115° F. and 175° F. Where in the present specification and claims reference is made to asphalt viscosities these have been determined according to ASTM method D–2170–63T and softening points were determined according to ASTM method D–36–62T.

The polychlorinated polyphenyls utilized in the compositions of this invention impart the important property of fire resistance thereto, but also unexpectedly increase the hardness and tensile strength of the combined product. The effect of the chlorinated polyphenyl resins on the physical properties of the compositions will be seen in the working examples given hereinafter.

In order to obtain maximum benefit with respect to fire resistance and physical properties imparted to the asphalt-block copolymer combination, it is necessary to utilize the resins in an amount between 15–35 weight percent based on the total composition, preferably in an amount between 20 and 30% by weight based on the three essential components, namely, asphalt, block copolymer, and chlorinated polyphenyl resin. Another characterizing feature of the resin is that it should contain between about 30 and 65% by weight of chlorine, preferably between about 35 and 55% by weight thereof and still more preferably have a softening point between about 50° C. and 200° C., still more preferably between about 150 and 195° C. as determined by ASTM method E28–51T.

For the most part, these resins may be either clear or colored and due to the presence of the asphalt the color of the resin is usually immaterial. In the usual conjugated diene rubbers, the presence of the chlorinated resin usually results in an adhesive, especially if an aromatic solvent is present. This is especially true since rubber based adhesives usually contain rubbers which have not been vulcanized and therefore are in a tacky condition which is promoted by both the aromatic solvent and the chlorinated resin. In the present instance, however, it is found that since the subject block copolymer more fully described hereinafter have the properties of culcanized rubbers and since no aromatic volatile solvent is present, the presence of the chlorinated polyphenyl resins have just the opposite effects upon the compositions, namely, reducing their tack, increasing their modulus, and improving their toughness, tensile strength, and hardness, all of which features were substantially unpredictable. The function of the chlorinated polyphenyl resins in increasing the hardness of the subject compositions is in direct contrast to their effect upon neoprene (polychloroprene) wherein the polyphenyl resins act as a softening agent.

The chlorinted polyphenyl resins are characterized by being very soluble in benzene and toluene but only slightly soluble in acetone or methanol.

The block copolymers forming a polymeric component of the compositions of this invention have the general configuration

A—B—A wherein each A is a polymer block of a vinyl arene, preferably styrene, although homologs and analogs thereof may be utilized, such as ring alkylated styrene, e.g., vinyltoluene or alkylated styrene such as alpha-methyl styrene; and the center block B is a polymer block of a conjugated diene. The conjugated dienes utilized for this purpose usually have 4–5 carbon atoms per molecule although higher molecular weight conjugated diene monomers may be utilized in place of or together with $C_{4-5}$ conjugated dienes. Thus, the preferred species are butadiene and isoprene, although methylisoprene may be employed for the present purpose.

It is preferred that the terminal blocks A have average molecular weights between about 8,000 and 45,000 while the center block B should have an average molecular weight between about 40,000 and 125,000. The optimum combination of physical properties is obtained when the terminal plastic blocks, e.g., polystyrene blocks, comprise 23–40% by weight of the total block copolymer.

The methods for preparation of such block copolymers do not constitute one of the essential aspects of the present invention. However, it may be stated that several types of processes may be used for their preparation. The preferred process involves a coupling step following the formation of an intermediate block copolymer. Thus, the process would comprise, for example, the use of a lithium alkyl to form a first polymer block such as polystyrene terminated with a lithium radical; injecting a conjugated diene such as butadiene into the system without further treatment of the polymer; allowing block copolymerization to occur to form an intermediate living copolymer A[½B]—Li and thereafter coupling these intermediate living block copolymers to form the block copolymer

A—B—A wherein a residue of the coupling agent usually remains in the center of block B. For the purpose of the present discussion and claims, this residue is ignored when describing the present block copolymers.

A second process for their formation comprises sequential block copolymerization, utilizing the same type of a catalyst such as lithium butyl to form a first polymer block such as polystyrene-Li, thereafter injecting the conjugated diene such as butadiene into the system; continuing block copolymerization to form the intermediate block copolymer polystyrene-polybutadiene-Li, and finally injecting a vinyl arene as styrene to form the second terminal block, resulting in the formation of the block copolymer polystyrene-polybutadiene-polystyrene.

Finally, a less preferred but possible process comprises the use of a di-lithium initiator such as di-lithium naphthalene and the like to initially form the center blocks such as a polybutadiene block terminated on both ends with lithium radicals. Thereafter, a vinyl arene monomer such as styrene is injected and block copolymerization occurs to form the desired three-block copolymer. However, the use of the di-lithium initiators necessitates the presence of polar compounds such as ethers or sulfides which in turn promote less desirable microstructure in the conjugated diene polymer block. Consequently, either the sequential and coupling processes briefly described above are preferred for the preparation of the subject block copolymers.

Within the generic concept of the class of block copolymers employed for the compositions of the present invention, the most preferred and effective class comprises those in which the polystyrene end blocks have average molecular weights of 9,000–20,000, and comprise 25–38% by weight of the total block copolymer while the conjugated diene center block has an average molecular weight between about 45,000 and 100,000.

Suitable block copolymers which may be employed for the present purpose include the following species:

Polystyrene-polyisoprene-polystyrene
Polystyrene-polybutadiene-polystyrene

The above described block copolymers may be utilized as such or may be hydrogenated to any desired degree. The oxidation and ozone resistance of the block copolymers are particularly improved by hydrogenation of the entire block copolymer at least to the extent of about 50% of the original unsaturation. This is beneficial not only for the improvement in oxidation stability but also for raising the softening point of the polymer.

Where in the above specification and in the claims reference is made to molecular weight it will be understood that these are determined by a relationship between intrinsic and osmotic molecular weight, viscosity measurements being made after the formation of each polymer block. These values agree closely with tritium counts made on tritium terminated blocks and block copolymers.

The following examples illustrate the preferred aspects of the present invention and emphasize the advantages gained and functions of each of the individual components.

The compositions may contain comminuted fillers in amounts of 10–250 parts by weight per 100 parts of the three essential components. The fillers may perform a variety of functions such as reducing tack, increasing hardness, reducing cost, etc. The usual fillers may be employed, such as whiting, asbestos, pigments, ground slate, crushed rock, etc.

*Example I*

The function of the chlorinated polyphenyl resins in increasing hardness, modulus, and tensile strength is shown by the following comparative examples. The asphalt employed for this purpose was a premium coating grade asphalt flux having the following properties:

| | |
|---|---|
| Flash point, °F | 595 |
| Solvent in CCl₄, percent w | 99.8 |
| Spot test, oliensis | Negative |
| Spot test, heptane-xylene equivalent | 20–25 |
| Viscosity at 210° F., S.S.F | 410 |

*Example III*

The variation in proportions of asphalt relative to the remaining components and the effect thereof upon physical properties of the resulting compositions are shown in Table III given below. For the purpose of comparison, the composition and physical properties of Sample A are repeated in Table III.

TABLE I

| Sample | Parts by Weight ||||| Properties |||||
|---|---|---|---|---|---|---|---|---|---|---|
| | Asphalt | Block Polymer | Chlorinated Polyphenyl ||| Hardness, Shore A | 300% Modulus | Tensile at Break, p.s.i. | Elongation at Break, percent | Softening Point, °F. |
| | | | Percent Cl | S.P., °F. | Parts by Wt. | | | | | |
| A | 400 | 100 | | | | 10 | 26 | 122+ | 1,500+ | 232 |
| B | 400 | 100 | 39 | 273 | 150 | 41 | 92 | 190+ | 900+ | 270 |
| C | 400 | 100 | 51 | 185 | 150 | 26 | 74 | 187+ | 900+ | 283 |
| D | 400 | 100 | 55 | 203 | 150 | 23 | 43 | 104+ | 900+ | 296 |
| E | 400 | 100 | 54 | 400+ | 150 | 39 | 82 | 239+ | 800+ | |
| F | 400 | 100 | | 400+ | 150 | 34 | 94 | 250+ | 800+ | |

TABLE II

| Sample | Parts by Weight ||||||| Properties ||||
|---|---|---|---|---|---|---|---|---|---|---|---|
| | Asphalt | Block Polymer | Chlorinated Polyphenyl ||| Whiting | Asbestos | Hardness, Shore A | 300% Modulus | Tensile at Break, p.s.i. | Elongation at Break, Percent |
| | | | Percent Cl | S.P., °F. | Parts by Wt. | | | | | | |
| A | 400 | 100 | | | | | | 10 | 26 | 122+ | 1,500+ |
| B | 400 | 100 | 39 | 273 | 150 | | | 41 | 92 | 190+ | 900+ |
| G | 400 | 100 | 39 | 273 | 150 | 280 | 100 | 78 | | 275 | 387 |

TABLE III

| Sample | Parts by Weight ||||||| Properties ||||
|---|---|---|---|---|---|---|---|---|---|---|---|
| | Asphalt | Block Polymer | Chlorinated Polyphenyl ||| Whiting | Asbestos | Hardness, Shore A | 300% Modulus | Tensile at Break, p.s.i. | Elongation at Break, Percent |
| | | | Percent Cl | S.P., °F. | Parts by Wt. | | | | | | |
| A | 400 | 100 | | | | | | 10 | 26 | 122+ | 1,500+ |
| H | 233 | 100 | | | | 333 | 67 | 44 | | 355 | 275 |
| J | 233 | 100 | 39 | 273 | 150 | 333 | 67 | 51 | 390 | 418 | 394 |

It will be seen from these data that the unmodified asphalt flux is too soft to have any tensile strength at room temperature. The block copolymer employed for the comparison was polystyrene-polybutadiene-polystyrene having average block molecular weights of about 12,000–59,000–12,000. The chlorinated polyphenyl resins had chlorine contents and softening points given in Table I below. It will be noted that each of the chlorinated polyphenyl resins substantially improves the physical properties required for high quality roofing.

*Example II*

The effect of filler upon the physical properties of the basic three-component composition is shown by the data contained in Table II below. The fillers employed were whiting and asbestos which were used to modify the composition of Sample B. For the purpose of comparison, Samples A and B from Table I are repeated in Table II. It will be noted that the addition of asbestos and whiting improved both the hardness and tensile strength of the compositions.

I claim as my invention:
1. As a new composition of matter,
  (a) 45% to about 75% by weight of an asphalt of the group consisting of straight run asphalts having a viscosity between about 350 and 450 SSF at 210° F., blown asphalts having a softening point between about 110° F. and 185° F., and mixtures thereof;
  (b) 15% to about 35% by weight of chlorinated polyphenyl resin containing from about 30% to about 65% by weight of chlorine;
  (c) and 10% to about 30% by weight of a block copolymer of the group consisting of copolymers having the general configuration

$$A-B-A$$

wherein each A is a polymer block of a vinyl arene and B is a polymer block of a conjugated diene; the average molecular weight of A being between about 8,000 and about 45,000, the average molecular weight of B being between about 40,000 and about 125,000; the total A content of the block copolymer being between about 23 and about 40 weight percent; and 2. As a new composition of matter,
(a) 50–70% by weight of a straight-run asphalt having a viscosity between about 370 and 430 SSF at 210° F.;
(b) 20–30% by weight of a chlorinated polyphenyl resin containing 35–55% by weight of chlorine and having a softening point between about 50° and 200° C.;
(c) and 15–25% by weight of a block copolymer having the general configuration

A—B—A wherein each A is a styrene polymer block and B is a polymer block of a conjugated diene having 4–6 carbon atoms per molecule; the average molecular weight of each block A being between about 9,000 and about 20,000 and the average molecular weight of block B being between about 45,000 and about 100,000, the total polystyrene block content being between about 25 and 38% by weight.

3. As a new composition of matter,
(a) 50–70% by weight of a blown asphalt having a softening point between about 115° and 175° F.;
(b) 20–30% by weight of chlorinated polyphenyl resin containing 25–55% by weight of chlorine and having a softening point between about 50° and 200° C.;
(c) and 15–25% by weight of a block copolymer having the general configuration

A—B—A wherein each A is a styrene polymer block and B is a polymer block of a conjugated diene having 4–6 carbon atoms per molecule; the average molecular weight of each block A being between about 9,000 and about 20,000 and the average molecular weight of the block B being between about 45,000 and about 100,000, the total polystyrene block content being about 25 and 38% by weight.

4. A new composition of matter according to claim 2 wherein the block copolymer has the general configuration Polystyrene-polybutadiene-polystyrene 5. A composition according to claim 1 comprising in addition 10–250 parts of comminuted filler per 100 parts by weight of the three-component-composition recited in claim 1.

6. As a new composition of matter,

| | Parts by weight |
|---|---|
| (a) Straight run asphalt, 375–425 SSF viscosity at 210° F | 400 |
| (b) Chlorinated polyphenyl resin 50–55% chlorine | 150 |
| (c) Polystyrene-polybutadiene-polystyrene block copolymer, having block molecular weights of 12,000–59,000–12,000 | 100 |

7. As a new composition of matter,

| | Parts by weight |
|---|---|
| (a) Straight run asphalt, 375–425 SSF viscosity at 210° F | 233 |
| (b) Chlorinated polyphenyl resin, 36–42% chlorine | 144 |
| (c) Polystyrene-polybutadiene-polystyrene block copolymers, having block molecular weights of 12,000–59,000–12,000 | 100 |
| (d) Whiting | 333 |
| (e) Ground asbestos | 67 |

References Cited

UNITED STATES PATENTS 2,480,298　8/1949　Happoldt ---------- 260—28.5
3,265,765　8/1966　Holden ------------ 260—28.5

JULIUS FROME, *Primary Examiner.*